US012602264B2

(12) United States Patent
Tantawi et al.

(10) Patent No.: US 12,602,264 B2
(45) Date of Patent: Apr. 14, 2026

(54) DATA CENTER WITH ENERGY-AWARE WORKLOAD PLACEMENT

(71) Applicant: INTERNATIONAL BUSINESS MACHINES CORPORATION, Armonk, NY (US)

(72) Inventors: Asser Nasreldin Tantawi, Somers, NY (US); Tamar Eilam, New York, NY (US); Ramachandra Rao Kolluri, Cranbourne East (AU); Eun Kyung Lee, Bedford Corners, NY (US); Arun Vishwanath, Nunawading (AU); Alaa S. Youssef, Valhalla, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 777 days.

(21) Appl. No.: 17/809,284

(22) Filed: Jun. 28, 2022

(65) Prior Publication Data

US 2023/0418687 A1 Dec. 28, 2023

(51) Int. Cl.
G06F 9/50 (2006.01)
G06F 1/3206 (2019.01)
(Continued)

(52) U.S. Cl.
CPC .......... G06F 9/5094 (2013.01); G06F 1/3206 (2013.01); G06F 9/4893 (2013.01);
(Continued)

(58) Field of Classification Search
None
See application file for complete search history.

(56) References Cited

U.S. PATENT DOCUMENTS 8,037,325 B1 * 10/2011 Dalal .................. G06F 11/3409
713/340
10,162,397 B2 12/2018 Matteson
(Continued)

OTHER PUBLICATIONS

Abbasi et al., "Tacoma: Server and Workload Management in Internet Data Centers Considering Cooling-Computing Power Trade-Off and Energy Proportionality", ACM Transactions on Architecture and Code Optimization, vol. 9, No. 2, Article 11, Publication date: Jun. 2012.

(Continued)

*Primary Examiner* — Abu Zar Ghaffari
(74) *Attorney, Agent, or Firm* — Steven M. Bouknight

(57) ABSTRACT

A computer-implemented method, a computer system and a computer program product for boosting efficiency through energy-aware workload placement. The method includes obtaining an energy profile for a plurality of computer servers and power consumption data for each computer server in the plurality of computer servers. The method also includes determining an optimal temperature for each computer server in the plurality of computer servers based on the energy profile. The method further includes determining a target processor utilization for each computer server in the plurality of computer servers based on the optimal temperature. In addition, the method includes calculating an efficiency rank for each computer server in the plurality of computer servers based on the target processor utilization and the power consumption data. Lastly, the method includes deploying a workload on a computer server with a highest efficiency rank.

20 Claims, 4 Drawing Sheets

(51) Int. Cl.
    *G06F 9/48*         (2006.01)
    *G06F 11/30*      (2006.01)
(52) U.S. Cl.
    CPC ........ *G06F 11/3058* (2013.01); *G06F 9/5072*
        (2013.01); *G06F 11/3006* (2013.01); *Y02D*
        *10/00* (2018.01)

(56)           References Cited

U.S. PATENT DOCUMENTS

| | | | |
|---|---|---|---|
| 11,023,288 B2 | 6/2021 | Rajamani | |
| 11,093,311 B2 | 8/2021 | Chagam Reddy | |
| 11,875,191 B1* | 1/2024 | Plenderleith | H04W 64/003 |
| 2009/0271141 A1* | 10/2009 | Coskun | G06F 1/206 |
| | | | 702/191 |
| 2010/0180275 A1* | 7/2010 | Neogi | G06F 1/3203 |
| | | | 718/1 |
| 2011/0016342 A1* | 1/2011 | Rowan | G06F 11/3062 |
| | | | 713/340 |
| 2011/0107126 A1* | 5/2011 | Goodrum | G06F 1/3203 |
| | | | 713/320 |
| 2011/0245981 A1* | 10/2011 | Refai-Ahmed | G06F 1/3203 |
| | | | 700/282 |
| 2015/0227397 A1* | 8/2015 | Gogula | G06F 9/5094 |
| | | | 718/104 |
| 2017/0279697 A1 | 9/2017 | Katsaros | |
| 2018/0234491 A1* | 8/2018 | Gomes De Oliveira | |
| | | | G06F 11/3433 |
| 2020/0026338 A1* | 1/2020 | Maddukuri | G06F 1/28 |
| 2020/0379527 A1* | 12/2020 | Yang | G06F 1/203 |
| 2021/0081027 A1* | 3/2021 | Park | G06F 1/329 |
| 2021/0298191 A1* | 9/2021 | Shao | H05K 7/20272 |
| 2022/0092375 A1* | 3/2022 | Ghose | G06F 9/5094 |
| 2022/0308927 A1* | 9/2022 | Chen | G06F 9/5094 |
| 2022/0334874 A1* | 10/2022 | Katiyar | G06F 9/542 |
| 2023/0273807 A1* | 8/2023 | Uppalapati | G06F 1/3206 |
| | | | 718/1 |

OTHER PUBLICATIONS

Barroso et al., "The Datacenter as a Computer: An Introduction to the Design of Warehouse-Scale Machines", Second Edition, Morgan & Claypool Publishers, Synthesis Lectures on Computer Architecture, 2013, pp. 1-156.
Barroso et al., "The Datacenter as a Computer: Design of Warehouse-Scale Machines", Third Edition, Morgan & Claypool Publishers, Synthesis Lectures on Computer Architecture, 2018, pp. 1-209.
Beloglazov et al., "Energy-aware resource allocation heuristics for efficient management of data centers for Cloud computing", http://dx.doi.org/10.1016/j.future.2011.04.017, Elsevier, SciVerse ScienceDirect, Future Generation Computer Systems 28, 2012, pp. 755-768.
Cadorel et al., "A workflow scheduling deadline-based heuristic for energy optimization in Cloud", DOI 10.1109/Things/GreenCom/CPSCom/SmartData.2019.00135, 2019 International Conference on Internet of Things (iThings) and IEEE Green Computing and Communications (GreenCom) and IEEE Cyber, Physical and Social Computing (CPSCom) and IEEE Smart Data (SmartData), 2019, pp. 719-728.
Carrasco et al., "Resource cost aware scheduling", https://doi.org/10.1016/j.ejor.2018.02.059, Elsevier, ScienceDirect, European Journal of Operational Research, 269, 2018, pp. 621-632.
Casalicchio, "Autonomic Orchestration of Containers: Problem Definition and Research Challenges", https://doi.org/10.4108/eai.25-10-2016.2266649, ACM, Conference '10, 2010, pp. 1-4.
Chi, et al., "Jointly Optimizing the IT and Cooling Systems for Data Center Energy Efficiency based on Multi-Agent Deep Reinforcement Learning", https://doi.org/10.1145/3396851.3402658, e-Energy '20, Proceedings of the Eleventh ACM International Conference on Future Energy Systems, Jun. 2020, pp. 489-495.

Dayarathna, et al., "Data Center Energy Consumption Modeling: A Survey", https://ieeexplore.ieee.org/search/searchresult.jsp?newsearch=true&queryText=Data%20center%20energy%20consumption%20modeling%20A%20survey., IEEE Communications Surveys & Tutorials, vol. 18, No. 1, First Quarter 2016, pp. 732-794.
De Meyer, et al., "Optimization-Based Scheduling of Data Center Workload in Function of Outside Weather Conditions", Symposium De Génie Électrique (SGE'16) : EF-EPF-MGE 2016, Jun. 7-8, 2016, Green-ER, France. p. 1-5.
Disclosed Anonymously, "Energy Saving Through Temperature Aware Storage Placement and Workload", IPCOM000206737D, https://ip.com/IPCOM/000206737, May 5, 2011, pp. 1-5.
Disclosed Anonymously, "Fine-Granular Approach to Achieve Differentiated Provisioning of Virtual Machines in a Cloud Based on the Specified PER-VM Energy Policies", IPCOM000228628D, https://ip.com/IPCOM/000228628, Jun. 25, 2013, pp. 1-7.
Dong et al., "Delayed best-fit task scheduling to reduce energy consumption in cloud data centers", 2019 International Conference on Internet of Things (iThings) and IEEE Green Computing and Communications (GreenCom) and IEEE Cyber, Physical and Social Computing (CPSCom) and IEEE Smart Data (SmartData, https://ieeexplore.ieee.org/search/searchresult.jsp?newsearch=true&queryText=Delayed%20best-fit%20task%20scheduling%20to%20reduce%20energy%20consumption%20in%20cloud%20data%20centers, 2019, pp. 729-736.
El-Sayed et al., "Temperature management in Data Centers: Why Some (Might) Like It Hot", https://doi.org/10.1145/2254756.2254778, Sigmetics '12, Jun. 2012, p. 163-174.
Fernandez-Cerero et al., "Security supportive energy-aware scheduling and energy policies for cloud environments", https://doi.org/10.1016/j.jpdc.2018.04.015, Elsevier, ScienceDirect, J. Parallel Distrib. Comput., 119, 2018, pp. 191-202.
Foreman, R.; "Boosting Data Center Efficiency Through Flexible Power Management", Preprinted from Dell Power Solutions, 2012 Issue 1. Copyright © 2012 Dell Inc. pp. 1-3.
Author Unknown, "Use of Virtualization for Power/Temperature Optimization in Large Data Centers", https://ip.com/IPCOM/000157645, IPCOM000157645D, Aug. 30, 2007, pp. 1-4.
Author Unknown, "Autonomous Learning Algorithm for Power Management", https://ip.com/IPCOM/000185155, IPCOM000185155D; Jul. 14, 2009, pp. 1-5.
Ilager et al., "ETAS: Energy and thermal-aware dynamic virtual machine consolidation in cloud data center with proactive hotspot mitigation", https://doi.org/10.1002/cpe.5221, Wiley, Research Article, 2019, pp. 1-15.
James et al., "A Low Carbon Kubernetes Scheduler", CEUR-WS.org/Vol-2382/ICT4S2019_paper_28.pdf, pp. 1-10.
Kaur et al., "KEIDS: Kubernetes-Based Energy and Interfereence Driven Scheduler for Industrial IoT in Edge-Cloud Ecosystem", https://ieeexplore.ieee.org/document/8825476, IEEE Internet of Things Journal, vol. 7, No. 5, May 2020, pp. 4228-4237.
Khan et al., "Handbook on Data Centers", DOI 10.1007/978-1-4939-2092-1, Springer, 2015, pp. 1-1309.
Khokhriakov et al., "Multicore processor computing is not energy proportional: An opportunity for bi-objective optimization for energy and performance", https://doi.org/10.1016/j.apenergy.2020.114957, ScienceDirect, Elsevier, Applied Energy, vol. 268, 2020, pp. 1-18.
Lee et al., "Proactive Thermal-Aware Resource Management in Virtualized HPC Cloud Datacenters", https://ieeexplore.ieee.org/document/7229319, IEEE Transactions on Cloud Computing, vol. 5, No. 2, 2017, pp. 234-248.
Liu et al., "Renewable and Cooling Aware Workload Management for Sustainable Data Centers", https://doi.org/10.1145/2254756.2254779, AMC Digital Library, Sigmetrics'12, Jun. 2012, p. 175-186.
Malla et al., "The effect of server energy proportionality on data center power oversubscription", https://doi.org/10.1016/j.future.2019.10.021, Elsevier, ScienceDirect, Future Generation Computer Systems, 104, 2020, pp. 119-130.
Mell et al., "The NIST Definition of Cloud Computing", National Institute of Standards and Technology, Special Publication 800-145, Sep. 2011, pp. 1-7.

(56)                References Cited

OTHER PUBLICATIONS

Moore et al., "Making Scheduling "Cool": Temperature-Aware Workload Placement in Data Centers", http://usenix.org/publications/library/proceedings/usenix05/tech/general/full_papers/moore/moore.pdf, USENIX Association, 2005 USENIX Annual Technical Conference, pp. 61-74.

Pahlevan et al., "Energy Proportionality in Near-Threshold Computing Servers and Cloud Data Centers: Consolidating or Not?", https://ieeexplore.ieee.org/document/8341994, IEEE, Design, Automation and Test in Europe, 2018, pp. 147-152.

Patterson et al., "The State of Data Center Cooling", http://download.intel.com/technology/eep/data-center-efficiency/state of-date-center-cooling, Intel Corporation, White Paper Digital Enterprise Group, Mar. 2008, pp. 1-12.

Pore et al., "Techniques to Achieve Energy Proportionality in Data Centers: A Survey", https://link.springer.com/chapter/10.1007/978-1-4939-2092-1_4, Springer Science+Business Media New York 2015, Handbook on Data Centers, pp. 109-162.

Rocha et al., "HEATS: Heterogeneity—and Energy-Aware Task-based Scheduling", https://www.researchgate.net/publication/334082339_HEATS_Heterogeneity-_and_Energy-Aware_Task-based_Scheduling, arXiv:1906.11321v1 [cs.DC] Jun. 26, 2019, pp. 1-6.

Sharma, et al., "Balance of Power: Dynamic Thermal Management for Internet Data Centers", https://ieeexplore.ieee.org/document/1407777, IEEE Internet Computing, 2005, pp. 42-49.

Townsend et al., "Improving Data Center Efficiency Through Holistic Scheduling in Kubernetes", DOI 10.1109/SOSE.2019.00030, 2019 IEEE International Conference on Service-Oriented System Engineering (SOSE), 2019, pp. 156-166.

Varsamopoulos, et al., Trends and Effects of Energy Proportionality on Server Provisioning in Data Centers, https://ieeexplore.ieee.org/document/5713198, IEEE, 2010, pp. 1-11.

Villebonnet et al., "Big, Medium, Little: Reaching Energy Proportionality With Heterogeneous Computing Scheduler", http://dx.doi.org/10.1142/S0129626415410066, Parallel Processing Letters, vol. 25, 2015, pp. 1-31.

Wang et al., "Thermal aware workload placement with task-temperature profiles in a data center", https://link.springer.com/article/10.1007/s11227-011-0635-z, Springer Science+Business Media, The Journal of Supercomputing, 2012, pp. 780-803.

* cited by examiner

100

200

START

OBTAIN ENERGY PROFILE OF EACH SERVER

202

DETERMINE OPTIMAL TEMPERATURE AND TARGET
PROCESSOR UTILIZATION FOR EACH SERVER     204

CALCULATE AN EFFICIENCY RANK FOR EACH SERVER

206

DEPLOY WORKLOAD ON SERVER WITH HIGHEST RANK

208

END

DATA CENTER WITH ENERGY-AWARE WORKLOAD PLACEMENT

BACKGROUND

Embodiments of the invention relate to the field of placing workloads on servers in a data center environment, and, in particular, to boosting data center efficiency by using energy-aware placement of workloads.

In the present-day technology environment, cloud data centers may consume large amounts of energy and the placement and deployment of workloads on the computer servers in cloud data centers may affect the energy consumption of the cloud data center. Major contributors to the energy consumption of the cloud data center may be the power consumption of the computer server hardware, cooling requirements within the computer server and also the overall cooling needs of the cloud data center. Therefore, consideration of these requirements at the time of workload deployment in the cloud data center may be important for the energy consumption of the cloud data center to be optimized.

SUMMARY

An embodiment is directed to a computer-implemented method for boosting efficiency through energy-aware workload placement. The method may include obtaining an energy profile for a plurality of computer servers and power consumption data for each computer server in the plurality of computer servers. The method may also include determining an optimal temperature for each computer server in the plurality of computer servers based on the energy profile. The method may further include determining a target processor utilization for each computer server in the plurality of computer servers based on the optimal temperature. In addition, the method may include calculating an efficiency rank for each computer server in the plurality of computer servers based on the target processor utilization and the power consumption data. Lastly, the method may include deploying a workload on a computer server with a highest efficiency rank.

In another embodiment, calculating the efficiency rank for each computer server in the plurality of computer servers may include identifying a current processor utilization of the computer server. Calculating the efficiency rank may also include determining a facility efficiency for each computer server in the plurality of computer servers based on the current processor utilization and the target processor utilization. Calculating the efficiency rank may further include determining a server efficiency for each computer server in the plurality of computer servers based on the power consumption data, where the server efficiency measures power consumed by the computer server in the plurality of computer servers with respect to processor utilization for the computer server. In addition, calculating the efficiency rank may include determining a compute efficiency for each computer server in the plurality of computer servers based on the power consumption data and the current processor utilization. Lastly, calculating the efficiency rank may include combining the facility efficiency, the server efficiency, and the compute efficiency for each computer server in the plurality of computer servers.

In a further embodiment, the facility efficiency comprises a difference between the target processor utilization and the current processor utilization.

In yet another embodiment, the compute efficiency comprises a ratio of the current processor utilization to a power consumption at the current processor utilization.

In an additional embodiment, determining the target processor utilization for each computer server in the plurality of computer servers uses a machine learning model that predicts an optimal resource utilization from the optimal temperature of a computer server.

In another embodiment, the method may include monitoring the energy profile for the plurality of computer servers and updating the efficiency rank for each computer server based on the energy profile.

In a further embodiment, the workload is selected from a list consisting of: a virtual machine (VM) and a container.

In addition to a computer-implemented method, additional embodiments are directed to a computer system and a computer program product for boosting efficiency through energy-aware workload placement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
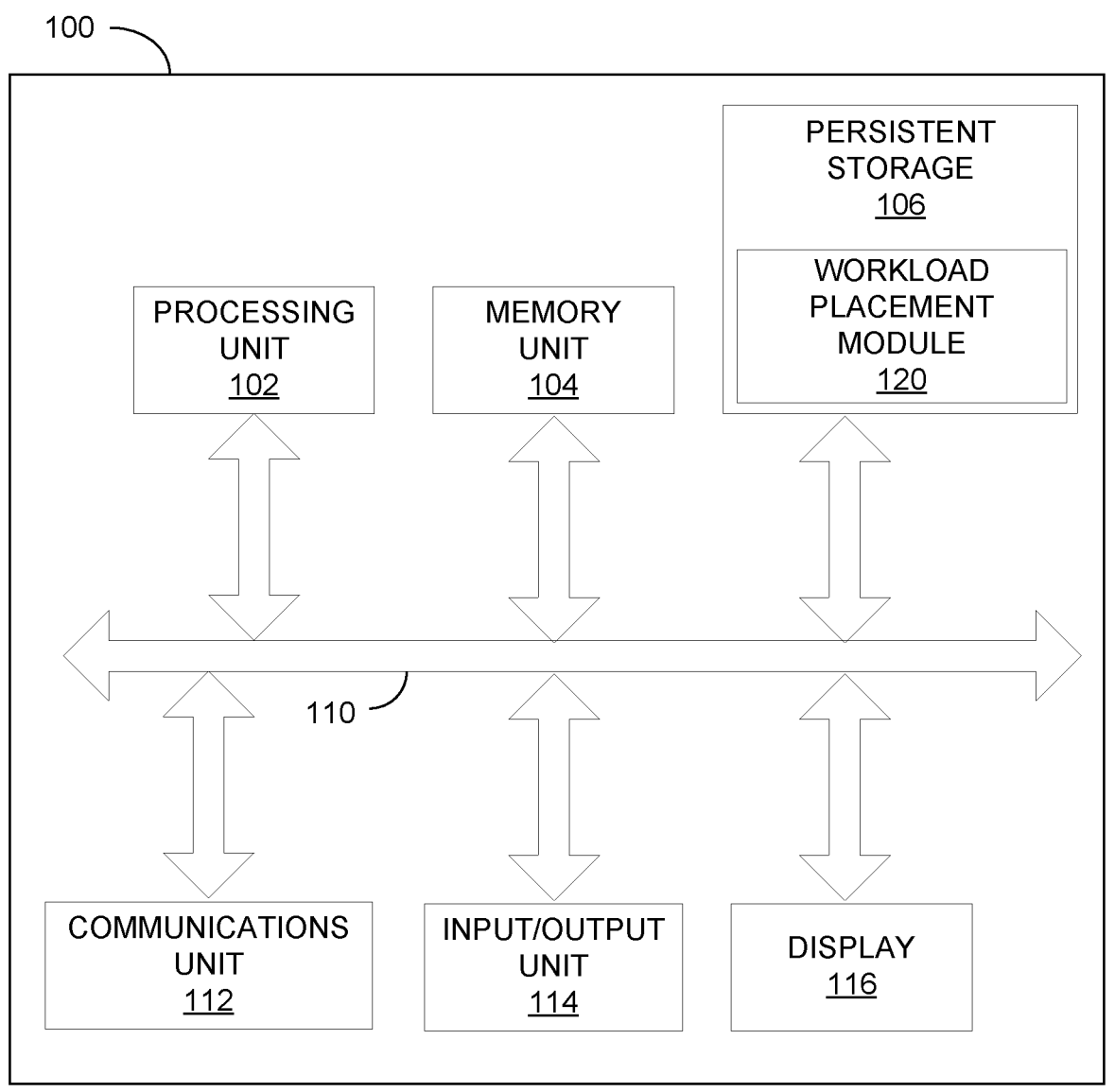
FIG. 1 depicts a block diagram of an example computer system in which various embodiments may be implemented.

In a present-day cloud data center, there may be several racks of computer servers installed to provide services to customers. Each computer server in the cloud data center may have minimum power and cooling requirements to function optimally within the data center and these requirements may change as workloads are deployed to each computer server within the cloud data center. In addition to the individual computer servers, great attention may be given to the cooling systems of the cloud data center. For instance, inside a typical air-cooled server, heat may be generated mainly by the CPU, but also by the power supplies, memory, data storage device, networking controller, core chipset, and so on. As the amount of heat increases, the fans have to run faster to remove that heat, but the relationship is not linear between power input to the fans and how effectively heat is removed. Therefore, it may be difficult to calculate cooling requirements simply as a direct relationship to power consumption.

In the past, a computer server may have housed one function and addition of new functions to the cloud data center may have required the addition of new computer server hardware to support the new function and energy requirements of the new computer server may have been considered in the physical deployment of the computer server hardware. Also, since an idle server still may consume power, existing methods of power conservation may consolidate workload from several lightly loaded servers to one heavily loaded server, and then suspend or shut-down the idled servers.

More recently, the development of workloads in software may mean that the deployment of a workload is accomplished by simply adding software to existing computer servers. Workloads may be stored as "images" and a new active instance of the workload may be instantiated from the image. Two types of workloads may be virtual machines and containers, where a virtual machine may be a workload that may include an instance of a stand-alone operating system running separate resources, e.g., connected devices, files and folders, network shares, CPU power, quantifiable hardware capabilities. A container may take this a step further by using operating-system-level virtualization, which refers to an operating system feature in which a single kernel may allow the existence of multiple isolated user-space instances, called containers. These isolated user-space instances may look like real computers from the point of view of programs running in them. While a computer program running on an ordinary operating system may see all resources of that computer, programs running inside a container or virtual machine may only see the contents and devices assigned to the container or virtual machine. Thus, a single computer server may look like several separate computers running concurrently to the applications that may be loaded and running within any one virtual machine or container. Therefore, the deployment of a new workload may affect the power requirements and the cooling requirements of a single computer server and the cumulative effect of deploying several workloads throughout a cloud data center may be great.

Therefore, it may be advantageous to provide a method that boosts efficiency through energy-aware workload placement in a data center. Such a method may obtain current deployment information from a cloud data center, specifically the power and cooling configuration for the data center as a whole and also each individual computer server in the cloud data center. This information may include the current amount of power drawn by the server and the cooling needs of the server, both internally, e.g., which fans may be running or a current temperature within the computer server hardware, and externally, e.g., fans that may be running or a load that may be placed on chillers or other cooling mechanisms that may be present within the cloud data center. Such a method may determine an optimal temperature for a computer server, which may in turn form a target power map that may include a target processor utilization for the server. This may be considered the optimal energy profile for each computer server and efficiency calculations may be made that may result in an efficiency rank for each computer server in the cloud data center relative to the other computer servers. Any workload that may be waiting for provisioning or deployment may then be deployed on the computer server with the highest rank. Such a method may specifically improve workload scheduling in cloud data centers by adding an energy awareness element to the scheduling and deployment of workloads in a cloud data center. This element may allow the scheduler to schedule and deploy workloads within a cloud data center environment more efficiently and also reduce cost and energy consumption of cloud data centers.

Referring now to FIG. 1, there is shown a block diagram illustrating a computer system 100 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements. For example, computer system 100 may be implemented in hardware only, software only, or a combination of both hardware and software. Computer system 100 may have more or fewer components and modules than shown, may combine two or more of the components, or may have a different configuration or arrangement of the components. Computer system 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of computer system 100 may be co-located or distributed, or the system could run as one or more cloud computing "instances," "containers," and/or "virtual machines," as known in the art.

As shown, a computer system 100 includes a processor unit 102, a memory unit 104, a persistent storage 106, a communications unit 112, an input/output unit 114, a display 116, and a system bus 110. Computer programs such as restore point selection module 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 all interface with each other through the system bus 110.

Examples of computing systems, environments, and/or configurations that may be represented by the computer system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof.

The computer system 100 may be used for boosting efficiency through energy-aware workload placement in a data center. In particular, a workload placement module 120 may be implemented within persistent storage 106 that may obtain a current energy profile for the data center as a while and also each computer server in a data server and, at the time for scheduling the next workload for deployment in the data center, may determine an optimal computer server for deployment based on the energy-aware method described herein. It should be noted that the workload placement module 120 may be loaded and run as a stand-alone module or may also be integrated into another application that may be loaded and running on the computer system 100, such as a virtual machine (VM) scheduler. In the case of integration with another application, the workload placement module 120 may be seen as enhancing the application with the features described below. One of ordinary skill in the art may recognize that many methods of scheduling workloads may exist and this method may be used in a container environment that may use a more complex scheme, e.g., Kubernetes, to schedule or provision workloads for deployment in a data center environment.

Figure 2:
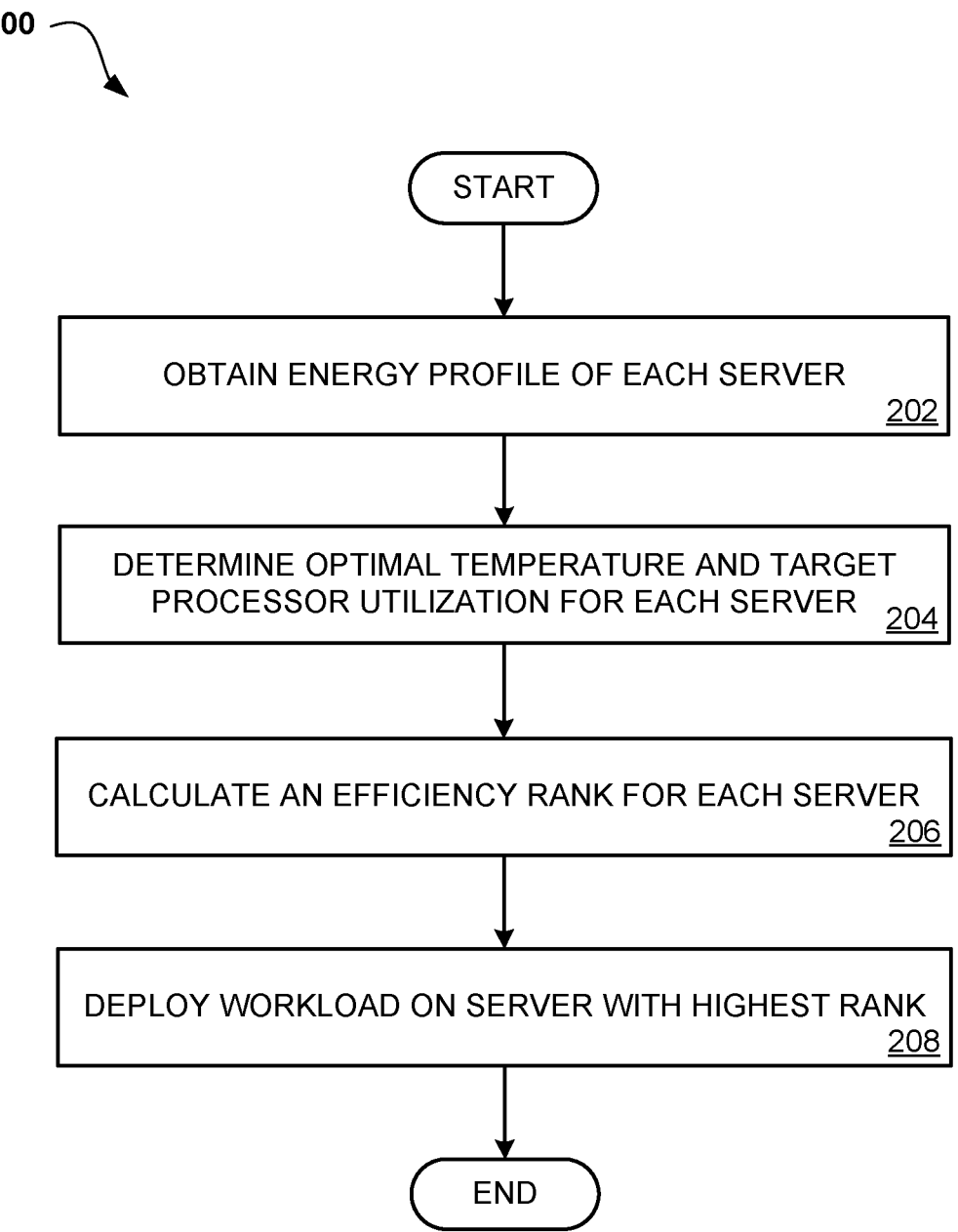
FIG. 2 depicts a flow chart diagram of a process for boosting efficiency through energy-aware workload placement in a data center in accordance with one or more embodiments.

Referring to FIG. 2, an operational flowchart illustrating a process 200 for boosting efficiency through energy-aware workload placement in a data center is depicted according to at least one embodiment. At 202, an energy profile may be obtained for a data center, including details about each computer server that may be installed in a cloud data center. The profile may be gathered from a database where the information may have been recorded or the workload placement module 120, or any other suitable software application, may gather the information in real-time, or a combination of both. The energy profile may be an overview of the current deployment state of the data center, including which workloads may be running on which computer server, and also the overall layout and characteristics of the data center, including power consumption of the entire center and the physical characteristics of the building, including specific information regarding the temperature in various areas within the building, e.g., near each computer server or rack of computer servers, as well as information about cooling mechanisms within the data center, such as fans or air conditioning, and air flow.

Included in the energy profile may be specific information about the equipment installed within each individual computer server, such as the processor or memory that may be used, and also specific information about the power consumption of the computer server and the various components. As an example, the computer server may have a 1 kW-rated power supply installed but only use 200 W, which would be detected at this step. The energy profile may include details about the power consumption at the component level, e.g., the electrical current draw of the processor or the network card or the hard drive within the computer server, and also information about fans or other cooling devices that may be running. In addition to power information, the energy profile may contain thermal information about the computer server, including the temperature inside the computer server, and correlate this information with any information that the energy profile may have regarding the cooling of the computer server and the mechanisms in place and currently running within the data center.

At 204, an optimal temperature and target processor utilization may be determined for each computer server using the detailed information from the energy profile. By understanding the specific characteristics of the data center, e.g., the cooling technology in place or the time of day or season when a new workload is being scheduled for deployment, and the current air flow dynamics within the data center, an optimal temperature may be predicted for each computer server in the data center and a target power map may be created for the data center that may also set a target processor utilization In an embodiment, supervised machine learning may be trained to produce a thermal model that may predict the optimal temperature from an understanding of the air flow and other cooling mechanisms that may be in place, as well as the specific information from the computer server about current temperature and power conditions. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include the specific information described above about the computer server, including power consumption of individual hardware components and temperature within a given computer server of a specific type, e.g., certain models of computer server. Training data may also include current and prior data from this data center or any other data center that may show how a computer server performs with respect to various temperatures and cooling conditions, as well as power consumption. This training data may be labeled with respect to performance and used to predict an optimal temperature for a specific computer server within the data center. The results of the thermal model may be stored in a database so that the data may be most current, and the output would always be up to date.

It should be noted that this same method of machine learning may be used to produce a power model for each computer server that may be aggregated into a target power map for the data center. The power model may predict a target processor utilization for each computer server in the data center based on the optimal temperature that the thermal model may predict and this target processor utilization, along with the characteristics of the computer server that may be known from prior data that may be collected and exist within the energy profile or current data from the energy profile, may be learned by another machine learning model that may update any of the above machine learning models to account for actual workload deployment and conditions within the data center.

At 206, an efficiency rank for each computer server in the data center may be calculated and used to weight, or enhance, more traditional methods of scheduling workloads. More traditional factors in ranking computer servers for workload deployment or choosing a computer server for deploying a workload may include a server weight calculation, which may be based on an allocation of computer servers and other resources and weighted according to a preference of an administrator, or a server selection process that may consider a number of installed workloads or the time when a workload was last deployed to the computer server. These traditional methods may not consider energy when determining where to deploy, or place, workloads.

To calculate the efficiency rank, three separate values may be determined that may be combined to form the efficiency rank: facility efficiency, server efficiency and compute efficiency. Facility efficiency for a given computer server may be defined as the deviation, or difference, between the current processor utilization of the computer server, as gathered from the energy profile or directly from the data center as described above or any other method, and the target processor utilization for the individual computer server. This difference may be calculated as a value that may also indicate whether the current processor utilization is above or below the target processor utilization, which may be used in the efficiency rank calculation since the optimal facility efficiency may be indicated by the greatest difference below the target processor utilization.

Server efficiency may be defined as a measurement of power consumption through the range of processor utilization for an individual computer server, from idle or no processor utilization to fully loaded or 100 percent utilization. The server efficiency may be represented by a curve, or graph, of power consumption with respect to processor utilization and an optimal server efficiency may be indicated where the power consumption remains low at high processor utilization. It should be noted that this curve may initially be gathered from a database or from a computer server manufacturer in the form of a standard specification but may be updated by a machine learning model that may be trained to learn the characteristics of a computer server as processor utilization may change.

Compute efficiency may be defined as a ratio of the current processor utilization, which may be gathered as described above, to the power consumption at the current processor utilization. The power consumption may be gathered directly from the computer server or initially from a manufacturer specification such that the information is current and accurate. An optimal compute efficiency may be the highest number among multiple computer servers in a data center.

The efficiency measurements may be combined to form an efficiency rank of a computer server relative to other computer servers in the data center where a new workload may be eligible to be placed. As mentioned with the individual efficiency measurements, supervised machine learning may be used to update any calculation at this step and the efficiency rank may be updated such that the computer servers in the data center may be ranked in a different order each time that the calculation may be updated.

At 208, a new workload that may be waiting for deployment on a computer server may be deployed to the computer server with highest calculated efficiency rank. It should be noted that the energy-aware process described herein may be included as an enhancement to existing workload scheduling applications and, therefore, a workload may first be scheduled based on more traditional factors, described above, and then subject to the efficiency ranking process, such that the efficiency rank may act as a weight or bias to a traditional workload scheduler.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
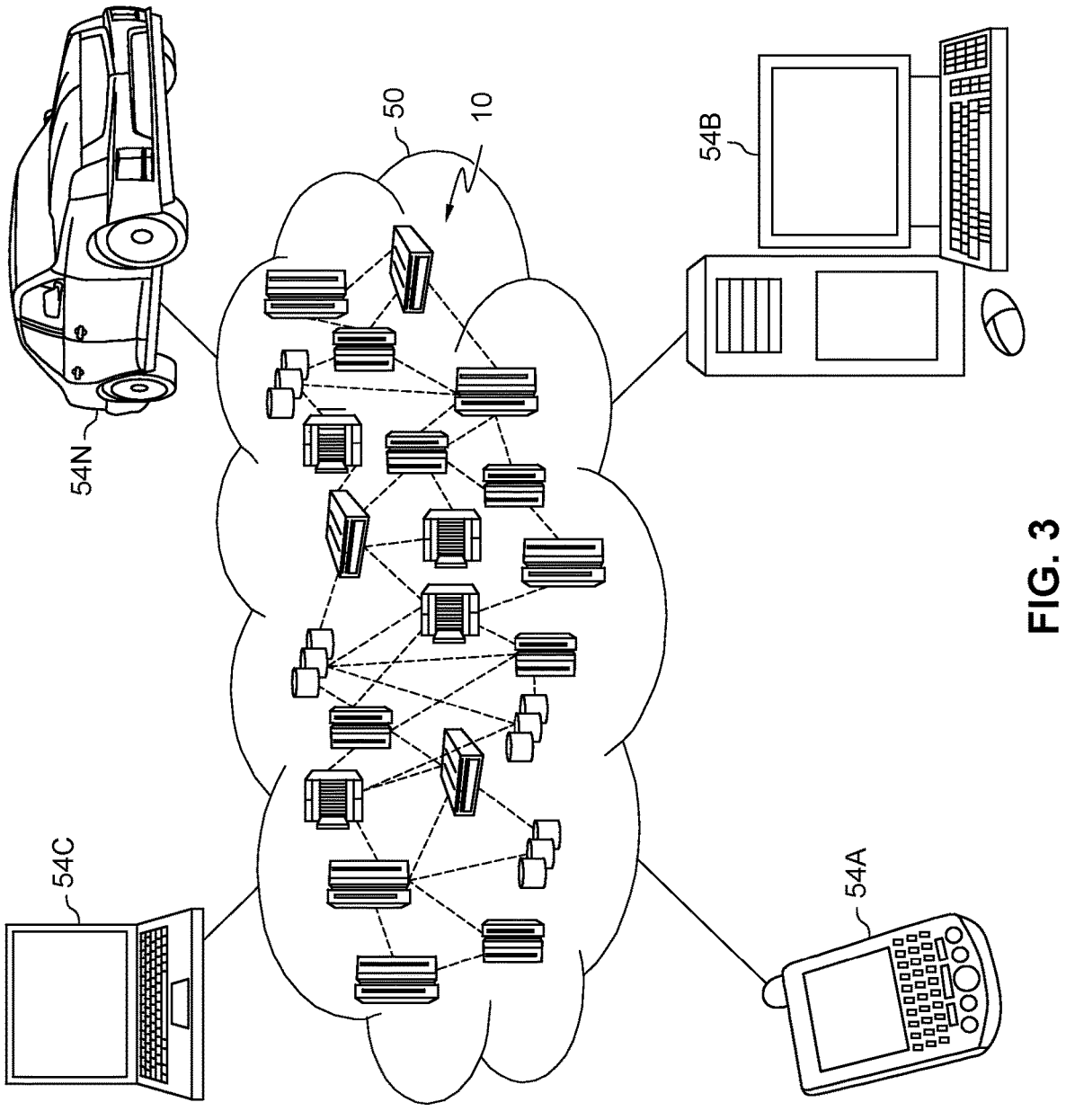
FIG. 3 depicts a cloud computing environment according to an embodiment.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
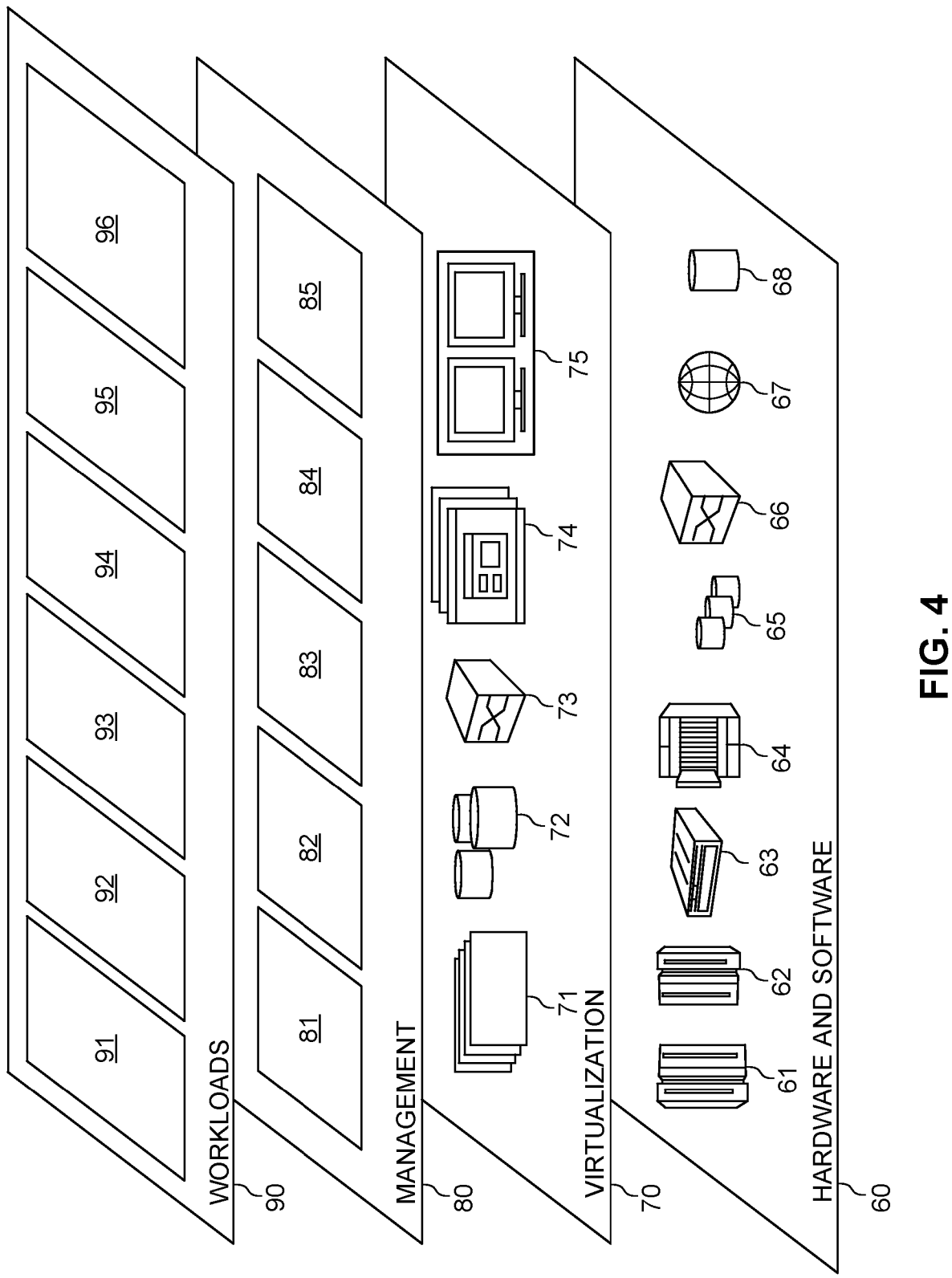
FIG. 4 depicts abstraction model layers according to an embodiment.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and energy-aware workload placement 96. Energy-aware workload placement may refer to ranking computer servers within a data center based on efficiency and adjusting the scheduling of workload deployment to achieve optimal energy consumption for the data center.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for boosting efficiency through energy-aware workload placement, the method comprising:

obtaining an energy profile for a plurality of computer servers including power consumption data for each computer server in the plurality of computer servers;

determining an optimal temperature for each computer server in the plurality of computer servers based on the energy profile;

determining a target processor utilization for each computer server in the plurality of computer servers based on the optimal temperature;

calculating an efficiency rank for each computer server in the plurality of computer servers based on the target processor utilization and the power consumption data, wherein the calculated efficiency rank is further based on a combination of a facility efficiency, a server efficiency, and a compute efficiency; and deploying a workload on a computer server with a highest efficiency rank.

2. The computer-implemented method of claim 1, wherein the calculating the efficiency rank for each computer server in the plurality of computer servers comprises:

identifying a current processor utilization of the computer server;

determining the facility efficiency for each computer server in the plurality of computer servers based on the current processor utilization and the target processor utilization;

determining the server efficiency for each computer server in the plurality of computer servers based on the power consumption data, wherein the server efficiency measures power consumed by the computer server in the plurality of computer servers with respect to a range of processor utilization for the computer server;

determining the compute efficiency for each computer server in the plurality of computer servers based on the current processor utilization and the power consumption data at the current processor utilization; and combining the facility efficiency, the server efficiency, and the compute efficiency for each computer server in the plurality of computer servers.

3. The computer-implemented method of claim 2, wherein the facility efficiency comprises a difference between the target processor utilization and the current processor utilization.

4. The computer-implemented method of claim 2, wherein the compute efficiency comprises a ratio of the current processor utilization to a power consumption at the current processor utilization.

5. The computer-implemented method of claim 1, wherein the determining the target processor utilization for each computer server in the plurality of computer servers uses a machine learning model that predicts an optimal resource utilization from the optimal temperature of a computer server.

6. The computer-implemented method of claim 1, further comprising monitoring the energy profile for the plurality of computer servers and updating the efficiency rank for each computer server based on the energy profile.

7. The computer-implemented method of claim 1, wherein the workload is selected from a list consisting of: a virtual machine (VM) and a container.

8. A computer system for boosting efficiency through energy-aware workload placement, the computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

obtaining an energy profile for a plurality of computer servers including power consumption data for each computer server in the plurality of computer servers;

determining an optimal temperature for each computer server in the plurality of computer servers based on the energy profile;

determining a target processor utilization for each computer server in the plurality of computer servers based on the optimal temperature;

calculating an efficiency rank for each computer server in the plurality of computer servers based on the target processor utilization and the power consumption data, wherein the calculated efficiency rank is further based on a combination of a facility efficiency, a server efficiency, and a compute efficiency; and deploying a workload on a computer server with a highest efficiency rank.

9. The computer system of claim 8, wherein the calculating the efficiency rank for each computer server in the plurality of computer servers comprises:

identifying a current processor utilization of the computer server;

determining the facility efficiency for each computer server in the plurality of computer servers based on the current processor utilization and the target processor utilization;

determining the server efficiency for each computer server in the plurality of computer servers based on the power consumption data, wherein the server efficiency measures power consumed by the computer server in the plurality of computer servers with respect to a range of processor utilization for the computer server;

determining the compute efficiency for each computer server in the plurality of computer servers based on the current processor utilization and the power consumption data at the current processor utilization; and combining the facility efficiency, the server efficiency, and the compute efficiency for each computer server in the plurality of computer servers.

10. The computer system of claim 9, wherein the facility efficiency comprises a difference between the target processor utilization and the current processor utilization.

11. The computer system of claim 9, wherein the compute efficiency comprises a ratio of the current processor utilization to a power consumption at the current processor utilization.

12. The computer system of claim 8, wherein the determining the target processor utilization for each computer server in the plurality of computer servers uses a machine learning model that predicts an optimal resource utilization from the optimal temperature of a computer server.

13. The computer system of claim 8, further comprising monitoring the energy profile for the plurality of computer servers and updating the efficiency rank for each computer server based on the energy profile.

14. The computer system of claim 8, wherein the workload is selected from a list consisting of: a virtual machine (VM) and a container.

15. A computer program product for boosting efficiency through energy-aware workload placement, the computer program product comprising:

a computer-readable storage device having program instructions embodied therewith, the program instructions executable by a processor to cause the processor to perform a method comprising:

obtaining an energy profile for a plurality of computer servers including power consumption data for each computer server in the plurality of computer servers;

determining an optimal temperature for each computer server in the plurality of computer servers based on the energy profile;

determining a target processor utilization for each computer server in the plurality of computer servers based on the optimal temperature;

calculating an efficiency rank for each computer server in the plurality of computer servers based on the target processor utilization and the power consumption data, wherein the calculated efficiency rank is further based on a combination of a facility efficiency, a server efficiency, and a compute efficiency; and deploying a workload on a computer server with a highest efficiency rank.

16. The computer program product of claim 15, wherein the calculating the efficiency rank for each computer server in the plurality of computer servers comprises:

identifying a current processor utilization of the computer server;

determining the facility efficiency for each computer server in the plurality of computer servers based on the current processor utilization and the target processor utilization;

determining the server efficiency for each computer server in the plurality of computer servers based on the power consumption data, wherein the server efficiency measures power consumed by the computer server in the plurality of computer servers with respect to a range of processor utilization for the computer server;

determining the compute efficiency for each computer server in the plurality of computer servers based on the current processor utilization and the power consumption data at the current processor utilization; and combining the facility efficiency, the server efficiency, and the compute efficiency for each computer server in the plurality of computer servers.

17. The computer program product of claim 16, wherein the determining the facility efficiency comprises a difference between the target processor utilization and the current processor utilization.

18. The computer program product of claim 16, wherein the compute efficiency comprises a ratio of the current processor utilization to a power consumption at the current processor utilization.

19. The computer program product of claim 15, wherein the determining the target processor utilization for each computer server in the plurality of computer servers uses a machine learning model that predicts an optimal resource utilization from the optimal temperature of a computer server.

20. The computer program product of claim 15, further comprising monitoring the energy profile for the plurality of computer servers and updating the efficiency rank for each computer server based on the energy profile.

* * * * *